United States Patent
Holliday

(10) Patent No.: US 9,191,584 B2
(45) Date of Patent: Nov. 17, 2015

(54) THERMAL IMAGER AND TRANSMITTER

(71) Applicant: Certification Information Limited, Middlesborough, Cleveland (GB)

(72) Inventor: Antony James Holliday, Haxby (GB)

(73) Assignee: Certification Information Limited, Middlesborough (GB)

( * ) Notice: Subject to any disclaimer, the term of this patent is extended or adjusted under 35 U.S.C. 154(b) by 422 days.

(21) Appl. No.: 13/718,703

(22) Filed: Dec. 18, 2012

(65) Prior Publication Data

US 2013/0155256 A1 Jun. 20, 2013

(30) Foreign Application Priority Data

Dec. 19, 2011 (GB) .................................. 1121818.7
Mar. 9, 2012 (GB) .................................. 1204224.8
Jun. 20, 2012 (GB) .................................. 1210908.8

(51) Int. Cl.
*H04N 5/33* (2006.01)
*G01K 13/00* (2006.01)
*E05F 1/10* (2006.01)
*G02B 7/00* (2006.01)

(52) U.S. Cl.
CPC .. *H04N 5/33* (2013.01); *E05F 1/10* (2013.01); *G01K 13/00* (2013.01); *G02B 7/006* (2013.01); *G02B 7/008* (2013.01)

(58) Field of Classification Search
CPC ............ H04N 5/33; E05F 1/10; G01K 13/00; G02B 7/006; G02B 7/008
See application file for complete search history.

(56) References Cited

U.S. PATENT DOCUMENTS

| | | | |
|---|---|---|---|
| 6,275,157 B1 * | 8/2001 | Mays et al. | 340/572.5 |
| 6,707,381 B1 * | 3/2004 | Maloney | 340/568.1 |
| 6,975,232 B1 * | 12/2005 | McKenna | 340/573.1 |
| 2001/0045463 A1 | 11/2001 | Madding et al. | |
| 2002/0014203 A1 | 2/2002 | Kim et al. | |
| 2004/0227987 A1 | 11/2004 | Holliday et al. | |
| 2005/0110610 A1 * | 5/2005 | Bazakos et al. | 340/5.82 |
| 2005/0145794 A1 * | 7/2005 | Faubion | 250/330 |
| 2006/0060786 A1 * | 3/2006 | Vilain | 250/338.1 |
| 2006/0209397 A1 * | 9/2006 | Holliday et al. | 359/350 |
| 2006/0216011 A1 | 9/2006 | Godehn | |
| 2008/0191841 A1 | 8/2008 | Fourreau | |

(Continued)

FOREIGN PATENT DOCUMENTS

EP 2110650 A1 10/2009
GB 2447666 A 9/2008

(Continued)

*Primary Examiner* — Christopher S Kelley
*Assistant Examiner* — Deirdre Beasley
(74) *Attorney, Agent, or Firm* — Taft Stettinius & Hollister LLP; Anthony P. Filomena

(57) ABSTRACT

A method of assessing the condition of a component through a thermal window, the method including storing information on a radio-frequency identification (RFID) tag associated with the component or the thermal window and taking a thermal image of the component through the thermal window using a thermal imaging device. The method also including retrieving the information on the RFID tag using a radio-frequency identification (RFID) reader on the thermal imaging device. Also, a thermal imaging system comprising a thermal imaging device including a radio-frequency identification (RFID) reader, and a thermal window having a radio-frequency identification (RFID) tag associated with the thermal window. The RFID reader may be adapted to access information on the RFID tag.

20 Claims, 4 Drawing Sheets

(56) References Cited

U.S. PATENT DOCUMENTS

| | | | |
|---|---|---|---|
| 2008/0272742 A1* | 11/2008 | Hart et al. | 320/150 |
| 2008/0309801 A1* | 12/2008 | Cuccias | 348/242 |
| 2010/0117010 A1* | 5/2010 | Ko et al. | 250/559.05 |
| 2010/0160809 A1* | 6/2010 | Laurence et al. | 600/549 |
| 2010/0161255 A1* | 6/2010 | Mian et al. | 702/56 |
| 2010/0277321 A1* | 11/2010 | McElwaine et al. | 340/572.1 |
| 2011/0096148 A1* | 4/2011 | Stratmann | 348/46 |
| 2013/0127602 A1* | 5/2013 | Jantunen et al. | 340/10.51 |
| 2014/0052809 A1* | 2/2014 | Keronen et al. | 709/213 |

FOREIGN PATENT DOCUMENTS

| | | |
|---|---|---|
| WO | 01/65046 A1 | 9/2001 |
| WO | 2012/037575 A1 | 3/2012 |

* cited by examiner

THERMAL IMAGER AND TRANSMITTER

CROSS REFERENCE TO RELATED APPLICATIONS

The present application claims the benefit of Great Britain Patent Application No. 1121818.7 filed on Dec. 19, 2011, and Great Britain Patent Application No. 1204224.8 filed on Mar. 9, 2012, and Great Britain Patent Application No 1210908.8 filed on Jun. 20, 2012, the disclosure of each of which is hereby incorporated by reference.

RELATED ART

1. Field of the Invention

The present invention relates to a thermal imaging device having a radio-frequency identification (RFID) reader and a method of monitoring the performance and/or behaviour of electronic equipment.

2. Brief Discussion of Related Art

In-situ monitoring of the performance and behaviour of electronic equipment, and in particular of control electronics and electronic components, is generally desirable to maintain optimal performance of the electronic components, to diagnose potential problems at an early stage, and thus to reduce or avoid major system problems and breakdowns. It is particularly desirable if diagnostic procedures can be carried out in-situ whilst the electronic components are functioning to avoid the expense and inconvenience of periods of down time.

The monitoring of thermal behaviour of electronic components and systems is known as an effective diagnostic tool for the evaluation of performance and the early identification of potential problems. Producing and analysing thermal images of such systems by means of suitable thermal imaging equipment can be a valuable aid in this regard.

Often the electronic components or systems are wholly or partially enclosed, for example behind a control panel and/or within a control box, and in such circumstances, the fitment of thermally transparent windows within the walls of the control panel, box or other enclosure can be used to enable the thermal monitoring of electronic components and systems within. Such windows may be provided at the time of manufacture of the apparatus or can be retrofitted.

Thermally transparent windows do not normally transmit 100% of the thermal energy, and a variable amount is typically absorbed or reflected by the window, and is therefore not detected by the thermal imaging equipment, which does not distinguish the amount of thermal energy absorbed by the window from the amount radiated by the target, which correspondingly causes an error in the reading obtained by the imaging equipment. The window may be calibrated to determine the extent of transmission losses of thermal energy through the window when the thermal image is recorded. The transmission losses can be determined and each window can be calibrated to allow estimation of the true thermal energy of the component inside the window, based on the measured data gathered by the thermal imaging device on the outside and knowledge of the window thermal transmission characteristics.

INTRODUCTION TO THE INVENTION

The present invention provides a thermal imaging device comprising a radio-frequency identification (RFID) reader for accessing data on a radio-frequency identification tag.

The invention also provides a method of determining the condition of a component through a thermal window, the method comprising storing information associated with the component in an RFID tag associated with the component, taking a thermal image of the component through the thermal window using a thermal imaging device, and retrieving the information on the RFID using an RFID reader associated with the thermal imaging device.

The window and/or the particular electronic equipment inside the window can be tagged and identified by a serial number. The serial number can optionally be a machine readable serial number, optionally embedded or encoded in the RFID tag. Optionally the serial number can be a human readable serial number. Optionally the serial number can be read automatically by the thermal imaging device, for example by the RFID reader therein. Serial numbers allow the sequential reading of thermal data from different components in an electrical system. In typical large installations, e.g. refineries, factories, ships, offshore installations, there can be many electrical components that need to be monitored for thermal variation that could be an indication of failure or requirement for maintenance or replacement before failure. Serial numbers allowing the identification of particular components to be scanned by the thermal imaging device allow better planning of maintenance routes for scanning larger installations, and make it easier to issue the required permits.

Optionally the RFID tag can store information concerning the location, characteristics, length of service etc of the component.

Optionally the RFID tag can store information about the transmission losses of the window associated with the component being scanned, and the data concerning transmission losses can optionally be read by the RFID reader on the thermal imaging device at the time of scanning the component. Accordingly, the thermal imaging device can access the specific transmission loss data for the particular window through which the thermal imaging device is scanning, and can thereby correct the measured thermal data collected from the component being scanned at the time of the collection of the sample.

The RFID tag may comprise an RFID device or transmitter. The RFID tag can be a read only tag or can be a read/write tag.

The thermal imaging device may comprise a camera. Optionally the thermal imaging device has low power characteristics, to permit its use in an explosive or otherwise hazardous atmosphere, whereby the electrical and/or thermal energy associated with the thermal imaging device is below the level at which there is a risk of ignition in an explosive atmosphere. The low power characteristics typically facilitate use of the thermal imaging device in explosive or otherwise hazardous atmospheres which may be found in hydrocarbon refineries, factories, ships, offshore oil and/or gas installations, and similar hazardous areas where risks of explosions are higher than normal.

A voltage of less than 5 volts may be considered low power and typically renders the voltage nonincendiary, that is not incendiary and therefore not capable of causing a fire. The thermal imager typically uses voltages of less than 5 volts and is therefore intrinsically safe, and therefore may be safely operated in a hazardous and/or explosive atmosphere or area.

In accordance with a further aspect of the present invention there is provided a communication system comprising: (a) a thermal imaging device including a radio-frequency identification reader, and (b) a thermal window including a radio-frequency identification tag, wherein the radio-frequency identification reader can access data from the radio-frequency identification tag.

The thermal window may include a thermally transparent window member.

The radio-frequency identification (RFID) tag may be in a window frame and/or cover of the thermal window and/or may be encased in the window frame and/or cover.

The RFID tag may be capable of storing and optionally transmitting information about the particular thermal window being monitored. The information may for example include the location of the thermal window and/or the transmission characteristics of the corresponding thermally transparent window member. Such information can be linked to the infrared image taken so that the operator can more easily catalogue and store images for historical analysis and trending. The transmission characteristics enable the user to correct for any attenuation caused by the thermally transparent window member either manually or automatically within a thermal imaging camera, thus providing fast and accurate measurement of the thermal characteristics of objects that are monitored.

The RFID tag may be passive, active or passive-battery assisted. An active tag uses a battery to periodically transmit its ID signal. A passive-battery assisted tag has a small battery that is activated by a RFID reader. A passive tag has no battery and instead uses the radio energy transmitted by the reader as its energy source.

In one embodiment the RFID tag may be positioned adjacent to the thermal window.

The RFID tag typically enables the thermal imaging device to communicate with the thermal window and as such correct the reading taken by the thermal imaging device or thermal imaging camera for transmission losses or any other error due to the crystal optics of the thermally transparent window member. The RFID tag may include calibration data for the correction of any errors in the reading obtained through the thermally transparent window member.

The RFID tag may provide the RFID reader with the information required to adjust and/or correct the infrared image data collected by the thermal imaging device for any errors due to the transmission characteristics of the corresponding thermally transparent window member. The data may be corrected and/or manipulated using software. The RFID reader may read the RFID tag.

The RFID tag may be a high frequency RFID tag. A typical high frequency may be 10 to 15 MHz, normally 13.5 MHz or more. Using the high frequency RFID tag reduces the likelihood of interference in the RFID signal transmitted by nearby or adjacent electronic equipment.

The RFID tag may be programmable either before installation, e.g. at a factory or in the field and may include information about the type of thermal window, its transmission characteristics, location and other information about its manufacture.

The thermal imaging device may communicate with a data server. The data server may be remotely located, and the thermal imaging device can optionally communicate with the data service by wireless transmission, or through a network. Information held on the data server may also be available for transmission to the thermal imaging device. The data communication between the thermal imaging device and the data server may be two-way. The data server may provide the thermal imaging device with information about the infrared transmission of the thermally transparent window. This may allow for real-time adjustment of any image obtained by the thermal imaging device to correct for the particular infrared transmission of the particular thermally transparent window.

Information about the infrared transmission of the thermally transparent window may be uploaded to the data server when the thermal window is manufactured or may be uploaded later.

The thermal imaging device may communicate directly with the data server or via for example a computer or PDA (Personal Digital Assistant) onto which data from the thermal imaging device has been downloaded. The thermal imaging device, computer or PDA and data server may be used in combination to create a schedule of the monitoring required and/or maintenance of the objects monitored.

The objects that are monitored are typically electronic components.

Data collected by the thermal imaging device may be saved in a database on the data server and indexed to a particular thermal window so that an operator of the electronic components can monitor or track potential problems or low-level faults with the electronic equipment.

The thermally transparent window member may be made of a material that is transparent to infrared radiation and a material therefore that infrared radiation is able to pass through. The material may be a glass or plastic or a crystalline material. The thermally transparent window member maybe made from calcium fluoride, sapphire glass, PolyIR™ polymer or any other suitable material that allows infrared transmission in the wavelength range of, for example, 0.5 µm-14 µm.

The thermal window typically serves to provide a physical barrier between the electronic components inside for example a control box and the operator of the thermal imaging device collecting information about the thermal behaviour of the electronic components. It will be understood that there are a number of reasons why this might be desirable, including physical protection of the equipment and in relation to user safety.

The thermal window may be calibrated. During calibration of the thermal window the transmission of infrared radiation through the window member is measured against a control window that has no thermal absorbance and therefore permits 100% transmission of the infrared radiation. The data obtained from the calibration can then be stored and/or assigned to the particular thermal window and used to correct the reading obtained using the thermal imaging device in real time.

The window member will commonly absorb some of the infrared radiation and therefore less than 100% of the infrared transmission is transmitted or passes through the window member and so is detectable to the thermal imaging device.

Calibration of the thermal window may include calibration across a temperature range from 20 to 150° C. Calibration readings may be taken at up to ten different temperatures in this range. Optionally a regression algorithm may be generated to map the loss of thermal transmission across the temperature range. The regression algorithm or regression curve may be a polynomial.

The regression curve may be stored in a database and/or memory of the thermal imaging device and loaded when a thermal reading is taken from the corresponding thermal window and the corresponding RFID tag is recognised and read by the RFID reader. The thermal imaging device may have the memory capacity to store up to 10,000 regression curves.

An RFID tag can typically be read by an RFID reader without the tag and reader being positioned in a particular geometric relationship with one another, for example, the RFID tag can be read by the reader, without the requirement for line-of-sight. This allows more effective determination of the condition of components where the component or its housing has an irregular shape or is not easily accessible to an operator.

The RFID reader within the thermal imager typically accesses the data stored within the window. Once the imaging device has retrieved the data (typically containing a unique ID code) from the window RFID tag it can then typically locate the calibration information for the window or if the window is new, the imaging device can optionally obtain this information from a server after download from the imaging device.

DETAILED DESCRIPTION

Figure 1:
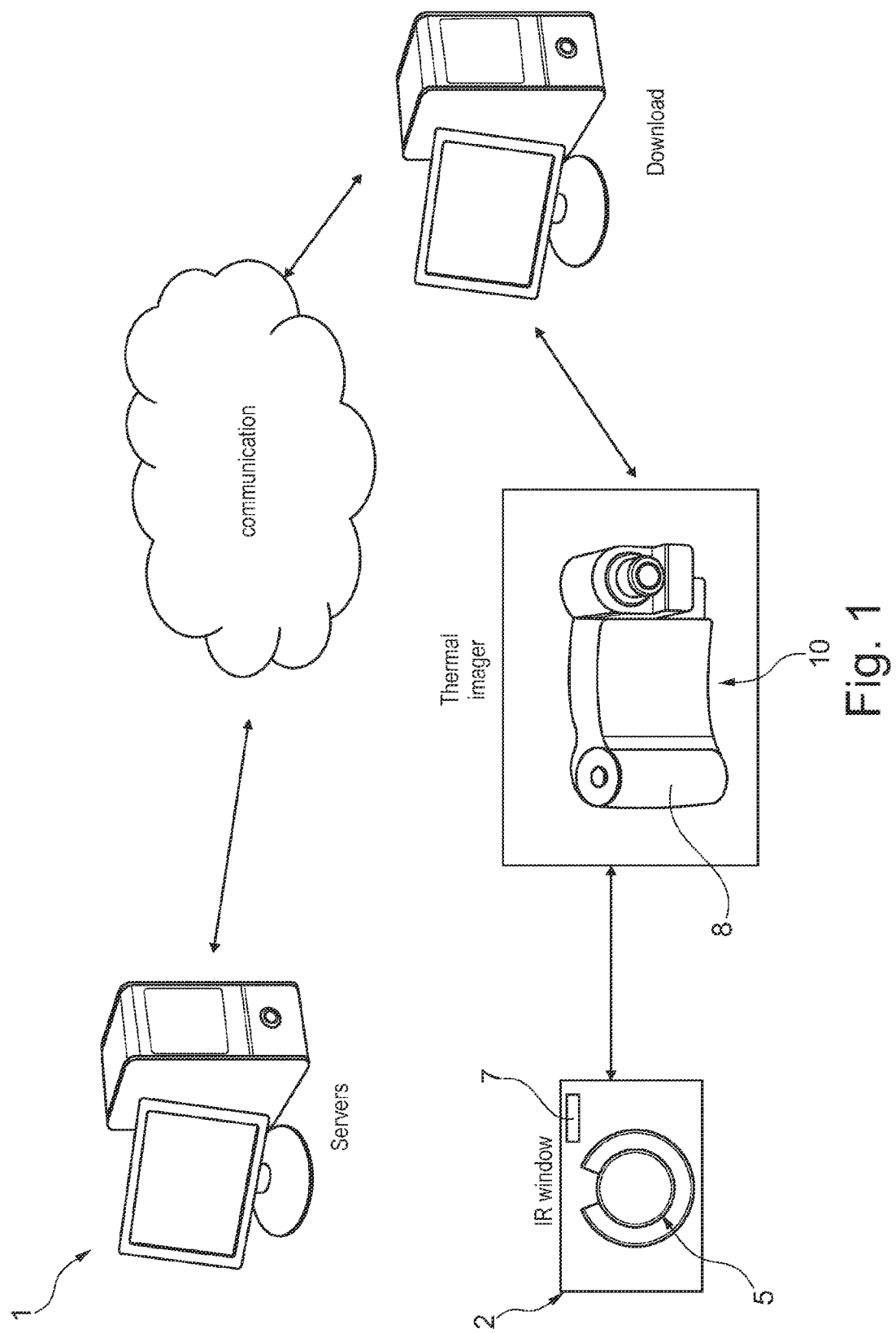
FIG. 1 is a schematic view of a thermal imaging system for determining the condition of an electronic component disposed in a housing behind a thermal window.

The exemplary embodiments of the present disclosure are described and illustrated below to encompass a thermal imaging device having a radio-frequency identification (RFID) reader and a method of monitoring the performance and/or behaviour of electronic equipment. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

The optional features of any aspect of the present invention can be incorporated into other aspects of the present invention. The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa.

All numerical values in this disclosure are understood as being modified by "about". All singular forms of elements, or any other components described herein are understood to include plural forms thereof and vice versa.

Referring now to the drawings, FIG. 1 shows a typical schematic view of an imaging system 1 using an imaging device in the form of a thermal camera, also referred to as an imaging device 10 having an RFID reader 8, arranged and configured to read an RFID tag 5 embedded in a thermal window 2. Each window typically incorporates a number of different (e.g. two or three) distinguishing characteristics allowing its identification and distinction from other windows of similar appearance. For example, the window may have a human readable serial number 7 to identify and distinguish the thermal window 2 from others of a similar appearance, in addition to the RFID tag, which may encode information specific to the window.

Within a typical installation such as a factory or refinery, or offshore oil or gas installation, there may be thousands of such windows allowing periodic thermographic inspection of the components housed behind them, and the identification of particular windows is extremely useful. Typically the identification of the window is coded into the RFID tag 5, typically in hexadecimal format.

The RFID tag in the window can optionally comprise a passive tag configured to transmit information to a reader in the camera 10 at high frequency, for example, 13.4 MHz.

Typically the tag 5 can be programmed with information concerning the window 2, for example, its material, thickness, density, and especially its transmission efficiency. In some cases the tag 5 can be programmed with information concerning the component behind the window 2, for example, its designation, its maximum performance characteristics such as maximum and minimum operating temperatures, installation date, maintenance review date, etc. In certain cases, the tag 5 can be programmed with information about multiple sources, e.g. both window and component.

Typically the RFID tag can be programmed with a code. The code may be a unique hexadecimal address. In typical embodiments, the tag itself merely holds the unique hexadecimal address corresponding to the particular correction algorithm for the window. The correction algorithm itself is typically stored in a database separate from the window, typically held on the camera or reader, or held on a network which can be accessed by the camera or reader, and the hexadecimal code is typically used to recall the correct algorithm from the database, typically via handheld instruments such as the camera or via a PC.

During production of each window, the window typically undergoes a calibration process designed to determine the efficiency of transmission of thermal energy through the window in an operational situation. Typically the calibration process is performed across a range of temperatures, for example 20-150° C., and a regression algorithm is typically created for each window 2 to map the transmission loss caused by the window 2 during scanning of the component by the imaging device 10.

To calibrate the window, a series of blackbody calibrators can be set at different temperatures within a specified band, typically 35-165° C. and placed in a chamber where temperature and humidity are closely monitored. Using a longwave thermal imager, the temperature of the blackbody calibrators is typically measured without the IR Window in place and then again with the IR Window between the camera and the blackbody "array". The difference at each temperature point with and without the IR Window is plotted on a graph and a best fit curve is created taking into account the effects of humidity and ambient temperature. Additional calibration options may include the effect of optic temperature and its effect on overall radiance experienced by the thermal imager.

The calibration regression curve is typically a polynomial. When the component is scanned by the imaging device 10 and the reading of thermal energy passing through the window 2 is taken for that particular component, the system 1 typically reads a hexadecimal code stored in the RFID tag 5 within the window 2, using the reader 8 on the imaging device 10, typically at a point when the window 2 is scanned by the imaging device 10 and the thermal reading taken. The imaging device 10 then retrieves from memory the calibration algorithm associated with the specified RFID hexadecimal code and applies the algorithm to the measured reading and automatically corrects the measured reading. Different codes can be stored within the RFID tag by known means.

Optionally the calibration algorithm can be stored within the tag and need not be stored within the camera or reader.

Typically each window has a different efficiency of transmission, and a different calibration curve. Typically the imaging device 10 is arranged to load the corresponding curve from a memory device (e.g. RAM) held in the camera 10 when the RFID tag is scanned, allowing correction of the reading taken through the window 2, to correct the measured reading for transmission losses absorbed by the window 2, in accordance with the calibration curve for that particular window. This allows corrected readings to be taken of each component in real time. Typically the camera can store the required correction algorithms within its memory, e.g. in a disk drive or flash drive or other form of electronic memory known to a person of ordinary skill in the art.

In a typical large commercial installation such as a refinery or oil production platform for example, there will be many electronic and other components that require or benefit from periodic thermographic image inspection. Embodiments of the present invention allow the operator to scan sequential components through their respective windows without opening the windows for inspection, and without a requirement for a particular geometric arrangement of the imaging device 10 and the window 2, before the RFID tag 2 can transmit the data to the reader in the imaging device 10. The operator can therefore walk through a particular route devised by a maintenance regime, inspecting some components that require more frequent inspection, or which are known to be approaching a maintenance or replacement threshold, and bypassing other components that do not require inspection at that time. The RFID reader 8 on the imaging device 10 accesses the RFID tags 5 on each of the windows 2 in the sequence chosen by the maintenance regime, typically accessing information concerning the transmission efficiency of the window in each case, which allows the user to log in real time the corrected thermal reading of each inspected component in the schedule. Optionally the RFID tag 5 can convey to the reader 8 information about the component. This information can be logged in or against the thermal image for later analysis and for identification of the window 2 and component behind it.

Typically when the data has been read by the reader 8, it can be transmitted to a server, optionally wirelessly, but typically at the end of a scanning run, when the data in the storage device in the thermal imaging device 10 can be downloaded and transmitted to servers.

Figure 2:
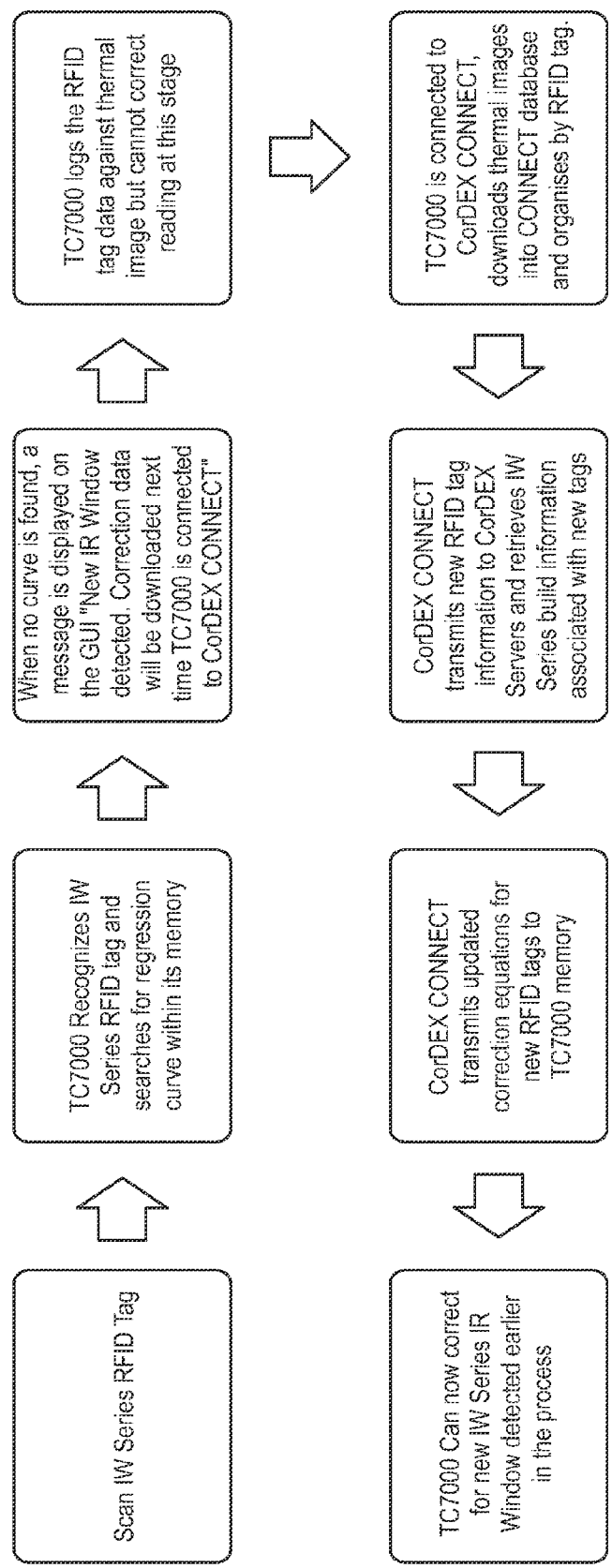
FIG. 2 is a schematic view showing one possible sequence of steps taken by the FIG. 1 system to determine the condition of the electronic component behind an unknown thermal window.

FIG. 2 shows a typical schematic view of the steps taken when the reader in the imaging device 10 scans a window that has not been scanned before. As shown in FIG. 2, the imaging device (designated TC7000) recognises the tag 5 in the window 2 and searches for a calibration/regression curve corresponding to that particular window 2 within its memory. The calibration curve is not loaded into the imaging device 10 in this example, and optionally the RFID reader gathers other information identifying the window and allowing the user to apply the regression curve to the measured thermal data after downloading to the servers. In this case, the RFID tag 2 transmits to the reader 8 some identification data allowing the correlation between this new window 2 and the regression curve for it in the server, and the imaging device 10 then records the uncorrected reading for this window and stores it in memory. The thermal image with the related data and identifiers is then downloaded from the imaging device 10 along with the hundreds or thousands of other thermal images for known and unknown windows, and the servers access the calibration information for the new windows at that time, uploading that information to the memory of the imaging device 10 for recognition of the "new" window in the next scanning run. The imaging device then allows corrected readings in real time from the newly recognised windows.

Passage of information between the imaging device 10 and the servers can be wireless, or through a physical connection. The imaging device 10 can be connected directly to the servers, or can be downloaded through an intermediary device, such as a PDA, etc, or can connect to the servers over a network, e.g. using the interne.

Figure 3:
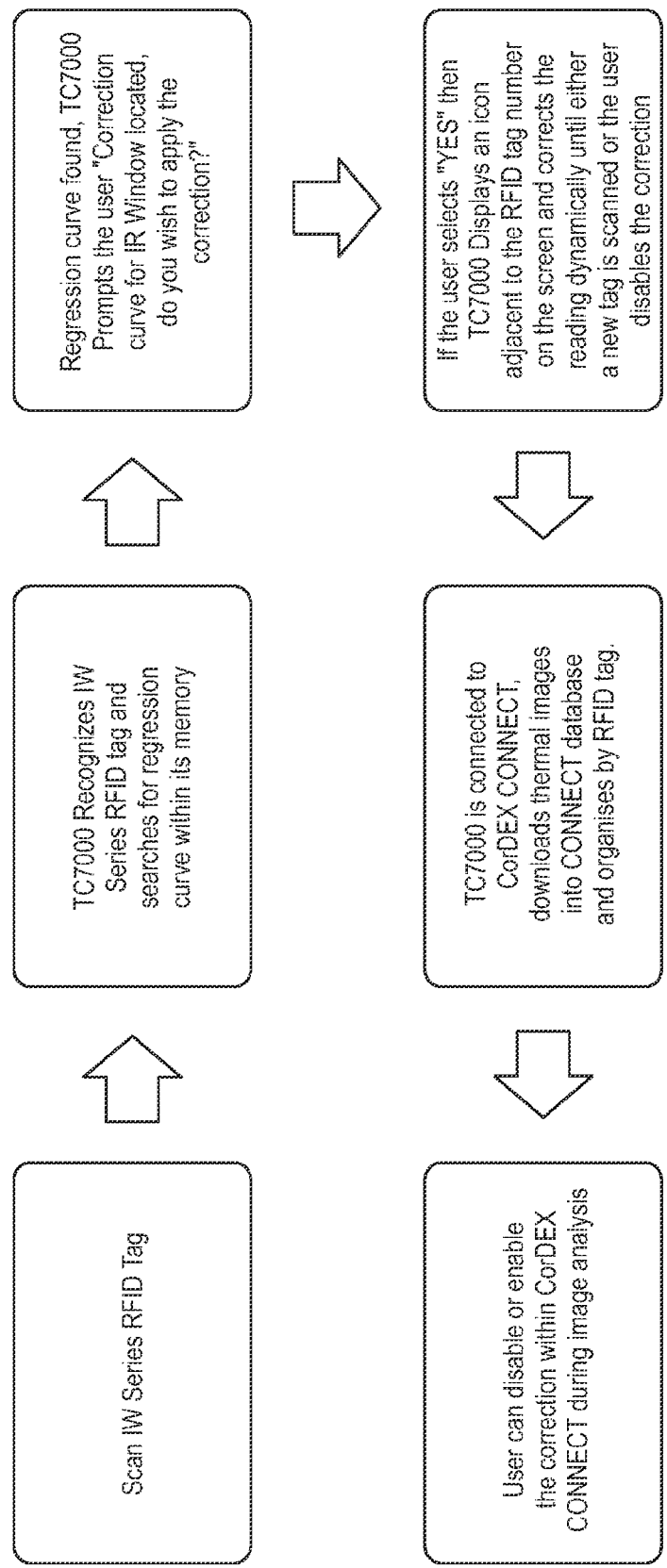
FIG. 3 is a schematic view showing one possible sequence of steps taken by the FIG. 1 system to determine the condition of the electronic component behind a known thermal window.

FIG. 3 shows a sequence of steps taken by the system when encountering an existing window. In such cases, the imaging device 10 recognises the RFID tag 5 on the window 2, accesses the information concerning the identification of the window and its regression curve, and searches for the appropriate regression curve within its memory. When the correct regression curve for the particular window 2 is found, the imaging device 10 prompts the user with the message "Correction curve for IR window located, do you wish to apply the correction?". If the user selects "Yes" then the imaging device 10 displays an icon adjacent to the RFID tag number on the screen and corrects the reading dynamically until either a new tag is scanned on a new window or the user disables the correction. When the imaging device 10 is connected to the server the data concerning the thermal images is downloaded into a database and can be organised by RFID tag, or by other parameters. Users can disable or enable the correction within CorDEX CONNECT™ during image analysis.

Figure 4:
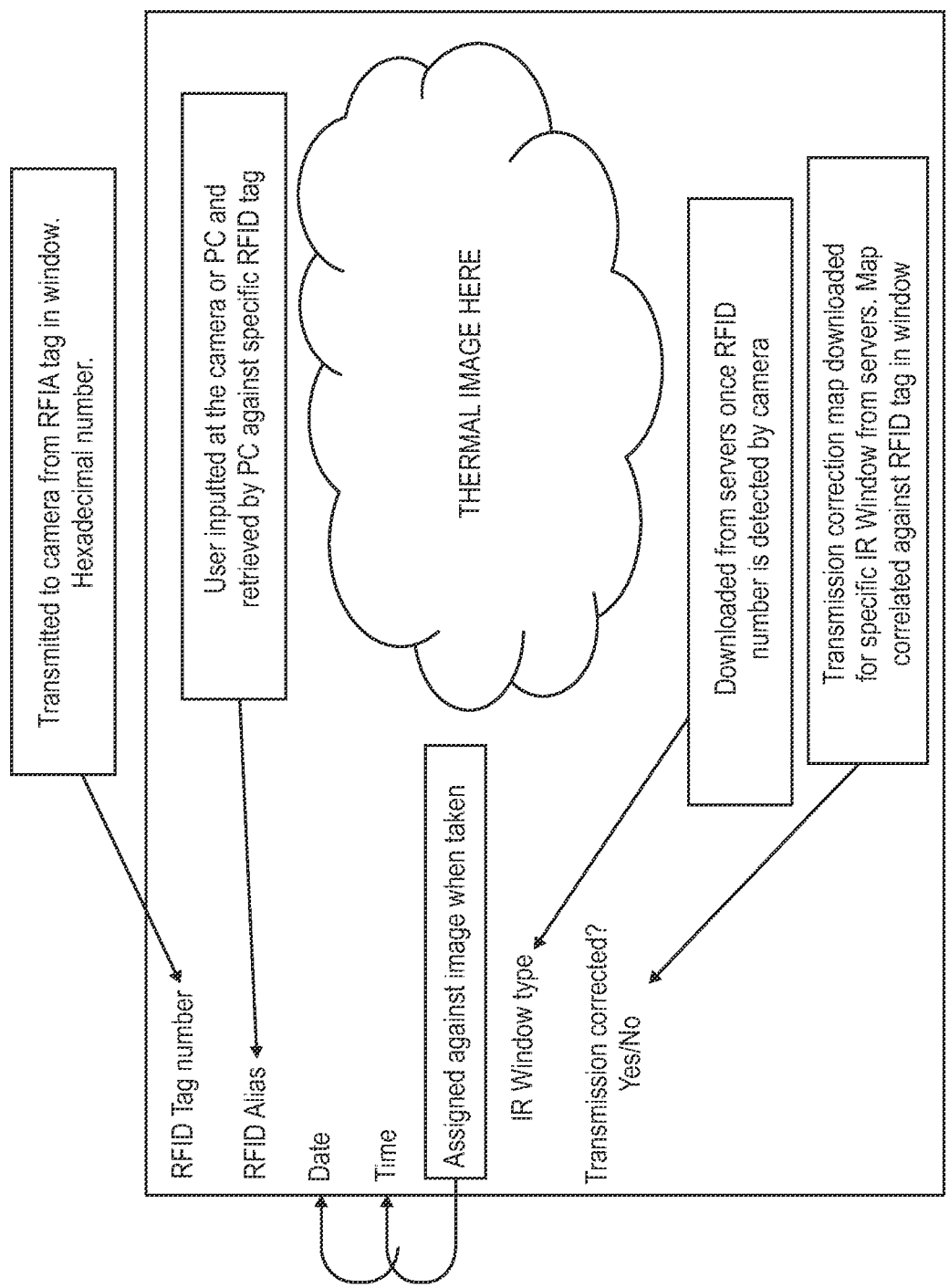
FIG. 4 is a schematic view showing one possible layout of a readout of the FIG. 1 system to determine the condition of the electronic component.

FIG. 4 shows a schematic view of some exemplary data recorded by the imaging device 10 in one embodiment of the invention. As shown in FIG. 4, the imaging device records and stores information such as: (a) RFID Tag number, typically a hexadecimal number, which is transmitted to the imaging device 10 from the RFID tag 5 in the window 2; (b) RFID Alias User can insert this code (e.g. human readable ID code on window or location of window) at the imaging device 10 or after downloading from the imaging device 10. Optionally the alias can automatically be retrieved by the server after downloading by matching a known alias against a specific RFID tag; (c) date and/or time, which can be assigned against image when taken, either automatically or manually by the user performing the scan; (d) window type—typically downloaded from server once RFID number is detected by imaging device 10; (e) transmission corrected? Yes/No—Transmission correction map can typically be downloaded for specific IR Window from servers. Map can be correlated against RFID tag in window.

Following from the above description and invention summaries, it should be apparent to those of ordinary skill in the art that, while the methods and apparatuses herein described constitute exemplary embodiments of the present invention, the invention is not limited to the foregoing and changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of assessing the condition of a component through a thermal window, the method comprising storing information on a radio-frequency identification (RFID) tag associated with the component or the thermal window, taking a thermal image of the component through the thermal window using a thermal imaging device, and retrieving the information on the RFID tag using a radio-frequency identification (RFID) reader on the thermal imaging device;
wherein the information retrieved from the RFID tag allows the identification of the transmission efficiency characteristics of the thermal window, and wherein the method includes the step of correcting the thermal image to allow for transmission losses of thermal energy as a result of transmission through the thermal window, and recording the corrected image on the thermal imaging device.

2. A method as claimed in claim 1, wherein the method includes the step of associating the information with the thermal image.

3. A method as claimed in claim 1, wherein the method includes the step of recording the information on the thermal image.

4. A method as claimed in claim 1, wherein the information retrieved from the RFID tag includes a unique identifier to identify the component or the thermal window.

5. A method as claimed in claim 1, wherein the information retrieved from the RFID tag relates to the characteristics of the component or the thermal window.

6. A method as claimed in claim 1, wherein the information on the RFID tag is retrieved automatically by the RFID reader on the thermal imaging device.

7. A method as claimed in claim 1, wherein the information retrieved from the RFID tag contains a unique identifier code associated with an algorithm stored in a memory device in the thermal imaging device, wherein the algorithm permits the transmission efficiency of the thermal window to be determined and the thermal image to be corrected for transmission losses, and wherein the method includes the step of correcting the thermal image for transmission losses, and recording the corrected image on the thermal imaging device.

8. A method as claimed in claim 1, wherein the thermal imaging device has low power characteristics, to permit its use in explosive or otherwise hazardous environment, whereby the electrical and/or thermal energy associated with the thermal imaging device is below the level at which there is a risk of ignition in an explosive environment.

9. A thermal imaging system comprising:
a thermal imaging device including a radio-frequency identification (RFID) reader, and
a thermal window having a radio-frequency identification (RFID) tag associated with the thermal window, wherein the RFID reader is adapted to access information on the RFID tag; and
wherein the information on the RFID tag allows identification of the transmission efficiency characteristics of the thermal window, and wherein the system is adapted to correct a thermal image obtained by the thermal imaging device to allow for transmission losses of thermal energy as a result of transmission through the thermal window, and to record the corrected thermal image.

10. A system as claimed in claim 9, wherein the RFID tag is encased in a part of the thermal window.

11. A system as claimed in claim 9, wherein the information on the RFID tag relates to characteristics of the thermal window.

12. A thermal imaging system comprising:
a thermal imaging device including a radio-frequency identification (RFID) reader, and
a thermal window having a radio-frequency identification (RFID) tag associated with the thermal window, wherein the RFID reader is adapted to access information on the RFID tag; and
wherein the information on the RFID tag contains a unique identifier code associated with an algorithm stored in a memory device in the thermal imaging device, wherein the algorithm permits the transmission efficiency of the thermal window to be determined when the thermal image is obtained by the thermal imaging device, and wherein the system is adapted to record a thermal image on the thermal imaging device wherein the thermal image includes thermal energy data that has been corrected by the algorithm allowing for transmission losses of thermal energy caused by the thermal window.

13. A system as claimed in claim 9, wherein data recorded on the thermal image includes at least one of: (a) location of the thermal window; (b) material, thickness, density, or transmission efficiency of the thermal window; (c) characteristics of a component behind the thermal window, including designation, maximum and minimum operating temperatures, installation date and/or maintenance review date; (d) RFID tag unique identifier; (e) date or time of collection of thermal data; (f) window type; and (g) whether or not the thermal image recorded was transmission corrected at the time of recordal on the imaging device.

14. A system as claimed in claim 9, wherein the information on the RFID tag is retrievable from the RFID tag using electromagnetic radiation having a high frequency, that is a frequency of from 10 to 15 MHz.

15. A system as claimed in claim 9, including a data server adapted to communicate with the thermal imaging device, the data server including earlier thermal images indexed to a particular thermal window, such that an operator of the thermal imaging device can monitor or track potential problems or low-level faults with a component behind the thermal window.

16. A system as claimed in claim 12, wherein the RFID tag is encased in a part of the thermal window.

17. A system as claimed in claim 12, wherein the information on the RFID tag relates to characteristics of the thermal window.

18. A system as claimed in claim 12, wherein data recorded on the thermal image includes at least one of: (a) location of the thermal window; (b) material, thickness, density, or transmission efficiency of the thermal window; (c) characteristics of a component behind the thermal window, including designation, maximum and minimum operating temperatures, installation date and/or maintenance review date; (d) RFID tag unique identifier; (e) date or time of collection of thermal data; (f) window type; and (g) whether or not the thermal image recorded was transmission corrected at the time of recordal on the imaging device.

19. A system as claimed in claim 12, wherein the information on the RFID tag is retrievable from the RFID tag using electromagnetic radiation having a high frequency, that is a frequency of from 10 to 15 MHz.

20. A system as claimed in claim 12, including a data server adapted to communicate with the thermal imaging device, the data server including earlier thermal images indexed to a particular thermal window, such that an operator of the thermal imaging device can monitor or track potential problems or low-level faults with a component behind the thermal window.

* * * * *